(12) United States Patent
Maeda

(10) Patent No.: US 12,134,693 B2
(45) Date of Patent: Nov. 5, 2024

(54) RESIN COMPOSITION FOR CERAMIC GREEN SHEET, CERAMIC GREEN SHEET, AND LAYERED CERAMIC CAPACITOR

(71) Applicant: SEKISUI CHEMICAL CO., LTD., Osaka (JP)

(72) Inventor: Takayuki Maeda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 526 days.

(21) Appl. No.: 17/599,262

(22) PCT Filed: Mar. 27, 2020

(86) PCT No.: PCT/JP2020/014057
§ 371 (c)(1),
(2) Date: Sep. 28, 2021

(87) PCT Pub. No.: WO2020/203786
PCT Pub. Date: Oct. 8, 2020

(65) Prior Publication Data
US 2022/0186017 A1    Jun. 16, 2022

(30) Foreign Application Priority Data
Mar. 29, 2019  (JP) .................... 2019-068378

(51) Int. Cl.
C08L 31/04 (2006.01)
C04B 35/634 (2006.01)
C08L 29/04 (2006.01)
H01G 4/30 (2006.01)

(52) U.S. Cl.
CPC .......... *C08L 31/04* (2013.01); *C04B 35/634* (2013.01); *C08L 29/04* (2013.01); *H01G 4/30* (2013.01)

(58) Field of Classification Search
CPC ......... C08L 31/04; C08L 29/04; C08L 29/14; C04B 35/634; C04B 35/4682; C04B 2235/5445; C04B 2235/6025; C04B 2235/606; C04B 2235/61; C04B 35/6342; H01G 4/30; H01G 4/12; C08F 216/38; C08K 5/12; B28B 1/30
USPC ...................................................... 524/503
See application file for complete search history.

(56) References Cited

U.S. PATENT DOCUMENTS 8,431,047 B2 *  4/2013  Ootsuki ............... C04B 35/581
                                                      525/472
2006/0014049 A1  1/2006  Ichinose et al.
2006/0096692 A1  5/2006  Sato et al.
2016/0032131 A1  2/2016  Shimazumi

FOREIGN PATENT DOCUMENTS

| | | |
|---|---|---|
| CN | 102822117 | 12/2012 |
| EP | 0 457 190 | 11/1991 |
| EP | 1 637 546 | 3/2006 |
| EP | 1 921 095 | 5/2008 |
| EP | 2 360 207 | 8/2011 |
| JP | 58-1766 | 1/1983 |
| JP | 3-35762 | 5/1991 |
| JP | 4-49766 | 8/1992 |
| JP | 2001-089245 | 4/2001 |
| JP | 3193022 | 5/2001 |
| JP | 2002-104878 | 4/2002 |
| JP | 2006-083060 | 3/2006 |
| JP | 2006-89354 | 4/2006 |
| JP | 2011-236304 | 11/2011 |
| JP | 5462700 | 4/2014 |
| JP | 2014-189681 | 10/2014 |
| JP | 5702311 | 4/2015 |
| WO | 2004/067475 | 8/2004 |
| WO | 2008/143195 | 11/2008 |
| WO | 2011/092963 | 8/2011 |

OTHER PUBLICATIONS

International Search Report issued Jun. 23, 2020 in International (PCT) Application No. PCT/JP2020/014057.
Extended European Search Report issued Jun. 27, 2012 in European Patent Application No. 09825984.9.
International Search Report issued Dec. 15, 2009 in International (PCT) Application No. PCT/JP2009/066153.

* cited by examiner

*Primary Examiner* — Hannah J Pak
(74) *Attorney, Agent, or Firm* — Wenderoth, Lind & Ponack, L.L.P.

(57) ABSTRACT

The present invention provides a resin composition for a ceramic green sheet capable of providing a ceramic green sheet that has high mechanical strength even with small thickness and is less likely to have appearance defects after cutting or dimensional changes after drying, and a ceramic green sheet and a multilayer ceramic capacitor each produced using the resin composition for a ceramic green sheet. Provided is a resin composition for a ceramic green sheet, the resin composition containing a polyvinyl acetal resin, the resin composition having a tan δ peak top of 1.25 or more and a loss modulus E″ of $2.30 \times 10^8$ Pa or more.

7 Claims, No Drawings

RESIN COMPOSITION FOR CERAMIC GREEN SHEET, CERAMIC GREEN SHEET, AND LAYERED CERAMIC CAPACITOR

TECHNICAL FIELD

The present invention relates to a resin composition for a ceramic green sheet capable of providing a ceramic green sheet that has high mechanical strength even with small thickness and is less likely to have appearance defects after cutting or dimensional changes after drying, and a ceramic green sheet and a multilayer ceramic capacitor each produced using the resin composition for a ceramic green sheet.

BACKGROUND ART

In recent years, electronic components installed in various electronic devices have become increasingly smaller and multilayered. Multilayer electronic components, such as multilayer circuit boards, multilayer coils, and multilayer ceramic capacitors, have been widely used.

Multilayer ceramic capacitors are typically produced through the following steps.

First, a plasticizer, a dispersant, and the like are added to a solution of a binder resin such as a polyvinyl butyral resin or a poly(meth)acrylate resin in an organic solvent. Ceramic raw material powder is then added and uniformly mixed in a mixer such as a bead mill or a ball mill and deaerated, whereby a ceramic slurry composition having a specific viscosity is obtained. This slurry composition is cast on a surface of a support such as a release-treated polyethylene terephthalate film or a SUS plate using a doctor blade, a reverse roll coater, or the like. The slurry composition is subjected to heating or the like to remove the organic solvent and other volatile components, and then separated from the support to give a ceramic green sheet.

Next, the obtained ceramic green sheet is screen-printed with a conductive paste that is to serves as an internal electrode. Sheets obtained in this manner are stacked such that the ceramic resin sheets and the conductive paste layers alternate with each other, and thermally pressure-bonded to produce a laminate. The obtained laminate is subjected to a treatment called debinding, that is, a treatment to remove components such as the binder resin component contained in the laminate by heat decomposition. The laminate is then fired to produce a ceramic sintered body, and external electrodes are sintered to the end surfaces of the ceramic sintered body. Through these steps, a multilayer ceramic capacitor is obtained.

With an increase in functionality and reduction in size of electronic devices, multilayer ceramic capacitors have been required to have smaller size and larger capacity. In response to this, ceramic green sheets have been produced using ceramic powder having a finer particle size (e.g., 0.5 μm or less), and attempts have been made to apply a slurry composition in a thinner film form (e.g., 5 μm or less) on a releasable support.

However, in the steps of producing ceramic green sheets, the thin film-form ceramic green sheets receive stress such as tension or bending. Thus, there is a demand for a ceramic green sheet that has strength to withstand these stresses.

In response to the demand, Patent Literatures 1 and 2 disclose that adjusting the degree of polymerization, the acetyl group content, and the acetal group content to predetermined ranges makes it possible to produce a slurry composition having excellent coatability without adding an excess of organic solvent.

CITATION LIST

Patent Literature

Patent Literature 1: JP 5462700 B
Patent Literature 2: JP 5702311 B

SUMMARY OF INVENTION

Technical Problem

However, even with the slurry compositions disclosed in Patent Literatures 1 and 2, the resulting ceramic green sheet may have insufficient strength and break when released from the support.

In addition, the ceramic green sheet may have an uneven section in the cutting step in the production of the ceramic green sheet, causing appearance defects.

Moreover, the ceramic green sheet may undergo a dimensional change in the drying step, causing dimensional errors after cutting.

In view of the situation in the art, the present invention aims to provide a resin composition for a ceramic green sheet capable of providing a ceramic green sheet that has high mechanical strength even with small thickness and is less likely to have appearance defects after cutting or dimensional changes after drying, and a ceramic green sheet and a multilayer ceramic capacitor each produced using the resin composition for a ceramic green sheet.

Solution to Problem

The present invention relates to a resin composition for a ceramic green sheet, the resin composition containing a polyvinyl acetal resin, the resin composition having a tan δ peak top of 1.25 or more and a loss modulus E" of $2.30 \times 10$ Pa or more.

The present invention is described in detail below.

As a result of extensive studies, the present inventor found out that a resin composition for a ceramic green sheet having a tan δ peak top and a loss modulus E" within predetermined ranges can provide a ceramic green sheet that has high mechanical strength even with small thickness and is less likely to have appearance defects after cutting or dimensional changes after drying. The inventors thus completed the present invention.

The resin composition for a ceramic green sheet of the present invention has a tan δ peak top of 1.25 or more. This allows the resin composition to impart appropriate flexibility. The lower limit of the tan δ peak top is preferably 1.55 and the upper limit thereof is preferably 3.00.

The tan δ peak top is a tan δ value at a peak temperature as measured using, for example, a DMA (produced by IT Measurement Co., Ltd.) under the conditions of a temperature range of 30° C. to 150° C., a temperature increase rate of 6° C./min, and a frequency of 1 Hz. The DMA measurement is preferably performed after the resin composition for a ceramic green sheet is formed into a sheet.

The resin composition for a ceramic green sheet of the present invention has a loss modulus E" of $2.30 \times 10^8$ Pa or more. A loss modulus E" within the above range allows the resin composition to impart appropriate flexibility. The lower limit of the loss modulus E" is preferably 2.30×10⁸ Pa and the upper limit thereof is preferably 2.80×10⁸ Pa.

The loss modulus is a loss modulus value at a peak temperature as measured using, for example, a DMA (produced by IT Measurement Co., Ltd.) under the conditions of a temperature range of 30° C. to 150° C., a temperature increase rate of 6° C./min, and a frequency of 1 Hz. The DMA measurement is preferably performed after the resin composition for a ceramic green sheet is formed into a sheet.

In the resin composition for a ceramic green sheet of the present invention, the difference between the peak-top temperature of the tan δ and the peak-top temperature of the loss modulus E" (difference in peak-top temperature: [peak-top temperature of tan δ]−[peak-top temperature of loss modulus E"]) is preferably 8.0° C. to 15.0° C. When the difference is within the above range, high film strength can be obtained. The lower limit of the difference in peak-top temperature is more preferably 9.0° C. and the upper limit thereof is more preferably 14.0° C.

The resin composition for a ceramic green sheet of the present invention contains a polyvinyl acetal resin.

The polyvinyl acetal resin contains a constitutional unit with an acetal group represented by the following formula (1), a constitutional unit with a hydroxy group represented by the following formula (2), and a constitutional unit with an acetyl group represented by the following formula (3).

[Chem. 1]

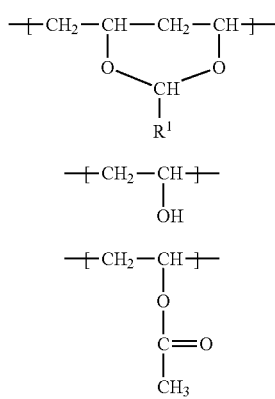

In the formula (1), R¹ represents a hydrogen atom or a C1-C20 alkyl group.

When R¹ in the formula (1) is a C1-C20 alkyl group, examples of the alkyl group include methyl, ethyl, n-propyl, isopropyl, n-butyl, iso-butyl, sec-butyl, and tert-butyl groups. Examples also include pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

In the polyvinyl acetal resin, the lower limit of the amount of the constitutional unit with an acetal group represented by the formula (1) (hereinafter also referred to as an "acetal group content") is preferably 45 mol % and the upper limit thereof is preferably 83 mol %.

The polyvinyl acetal resin having an acetal group content of 45 mol % or more can have improved solubility in an organic solvent. The polyvinyl acetal resin having an acetal group content of 83 mol % or less can have excellent toughness.

The lower limit of the acetal group content is more preferably 60 mol %, still more preferably 62 mol %, particularly preferably 65 mol %, and the upper limit thereof is more preferably 80 mol %, still more preferably 78 mol %.

The acetal group content herein is calculated by a method in which the constitutional units with two hydroxyl groups having been acetalized are counted, because the acetal group in the polyvinyl acetal resin is obtained by acetalizing two constitutional units having a hydroxy group in the polyvinyl alcohol resin.

In the polyvinyl acetal resin, the lower limit of the amount of the constitutional unit with a hydroxy group represented by the formula (2) (hereinafter also referred to as a "hydroxy group content") is preferably 18 mol % and the upper limit thereof is preferably 45 mol %.

The polyvinyl acetal resin having a hydroxy group content of 18 mol % or more can have excellent toughness. The polyvinyl acetal resin having a hydroxy group content of 45 mol % or less can have sufficiently improved solubility in an organic solvent.

The lower limit of the hydroxy group content is more preferably 20 mol %, still more preferably 22 mol %, and the upper limit thereof is more preferably 40 mol %, still more preferably 37 mol %.

In the polyvinyl acetal resin, the lower limit of the amount of the constitutional unit with an acetyl group represented by the formula (3) (hereinafter also referred to as an "acetyl group content") is preferably 0.5 mol % and the upper limit thereof is preferably 20 mol %.

The polyvinyl acetal resin having an acetyl group content of 0.5 mol % or more can be less prone to viscosity increase caused by intramolecular or intermolecular hydrogen bonding between hydroxy groups in the polyvinyl acetal resin. The polyvinyl acetal resin having an acetyl group content of 20 mol % or less does not have too high flexibility and can have improved handleability.

The lower limit of the acetyl group content is more preferably 1.0 mol % and the upper limit thereof is more preferably 18 mol %.

The polyvinyl acetal resin preferably has an average degree of polymerization of 1,000 to 10,000.

The polyvinyl acetal resin having an average degree of polymerization of 1,000 or more can impart sufficient mechanical strength even in producing a thin resin sheet such as one having a thickness of 20 μm or less. The polyvinyl acetal resin having an average degree of polymerization of 10,000 or less can have sufficiently improved solubility in an organic solvent and thus have excellent coatability and dispersibility. The polyvinyl acetal resin having a degree of polymerization within the above range can provide a ceramic green sheet having high mechanical strength and being less likely to have appearance defects after cutting and dimensional changes after drying.

The lower limit of the average degree of polymerization is more preferably 1,050, still more preferably 1,100, and the upper limit thereof is more preferably 5,000, still more preferably 4,900, most preferably 4,800.

The polyvinyl acetal resin preferably has a hydroxy group half-width in terms of mol % of 0.01 to 0.15 mol %/cm⁻¹ as determined by NMR measurement and IR measurement. The polyvinyl acetal resin having a hydroxy group half-width in terms of mol % within the above range can provide a ceramic green sheet having high mechanical strength and being less likely to have appearance defects after cutting and dimensional changes after drying. The hydroxy group half-width in terms of mol % is more preferably 0.01 to 0.145 mol %/cm$^{-1}$.

The IR measurement refers to measurement of an absorption spectrum by infrared absorption spectroscopy, and can be performed with an IR measurement device.

The hydroxy group half-width in terms of mol % can be calculated by measuring the hydroxy group half-width from the peak width at half the height of a peak appearing near 3,500 cm$^{-1}$ in the IR measurement, then measuring the hydroxy group content by NMR measurement, and dividing the hydroxy group content by the hydroxy group half-width.

The polyvinyl acetal resin can be typically produced by acetalizing a polyvinyl alcohol resin.

The method for the acetalization is not limited and may be a conventionally known method. Examples of the method include one in which an aldehyde is added to a solution of a polyvinyl alcohol resin in water, an alcohol, a water/alcohol mixture, or dimethylsulfoxide (DMSO) in the presence of an acid catalyst.

Examples of the aldehyde include linear, branched, cyclic saturated, cyclic unsaturated, or aromatic aldehydes having a carbon number of 1 to 19. Specific examples thereof include formaldehyde, acetaldehyde, propionylaldehyde, n-butyraldehyde, isobutyraldehyde, tert-butyraldehyde, benzaldehyde, and cyclohexylaldehyde. The aldehydes may be used alone or in combination of two or more thereof. In the above aldehyde compounds excluding formaldehyde, one or more hydrogen atoms may be replaced with halogens, for example.

The polyvinyl alcohol resin may be, for example, a conventionally known polyvinyl alcohol resin such as a resin produced by saponifying polyvinyl acetate with an alkali, an acid, aqueous ammonia, or the like.

The polyvinyl alcohol resin may be completely saponified, but is not necessarily completely saponified and may be a partially saponified polyvinyl alcohol resin as long as the polyvinyl alcohol resin has at least one unit having a hydroxyl group diad for a meso or a racemo position in at least one position of the main chain. Examples of other polyvinyl alcohol resins that can be used include copolymers of vinyl alcohol and a monomer copolymerizable with vinyl alcohol such as ethylene-vinyl alcohol copolymer resins and partially saponified ethylene-vinyl alcohol copolymer resins.

Examples of the polyvinyl acetate resin include ethylene-vinyl acetate copolymers.

The polyvinyl acetal resin constituting the resin composition for a ceramic green sheet of the present invention is preferably an acetalized product of a polyvinyl alcohol resin having a degree of saponification of 75 mol % or more. In particular, the polyvinyl acetal resin constituting the resin composition for a ceramic green sheet of the present invention is preferably an acetalized product of a polyvinyl alcohol resin having a hydroxy group half-width of 300 to 400 cm$^{-1}$ as determined by IR measurement, particularly preferably an acetalized product of a polyvinyl alcohol resin having a hydroxy group half-width of 340 to 400 cm$^{-1}$ as determined by IR measurement. This allows the resin composition for a ceramic green sheet of the present invention to have a tan δ peak top and a loss modulus E" in predetermined ranges.

The polyvinyl alcohol resin typically contains a carboxylic acid salt that is a basic component generated during saponification. The carboxylic acid salt is preferably removed by washing or neutralized before use. Removal by washing or neutralization of the carboxylic acid salt can effectively reduce the condensation reaction of the aldehyde catalyzed under basic conditions, thus further reducing resin discoloration.

The washing in the washing step may be performed by a method including extracting the basic component with a solvent, a method including dissolving the resin in a good solvent and then adding a poor solvent to reprecipitate the resin alone, or a method including adding an adsorbent to a solution containing the polyvinyl alcohol resin to remove the basic component by adsorption.

Examples of a neutralizer used in the neutralizing step include mineral acids such as hydrochloric acid, sulfuric acid, nitric acid, and phosphoric acid, inorganic acids such as carbonic acid, carboxylic acids such as formic acid, acetic acid, propionic acid, butyric acid, and hexanoic acid, aliphatic sulfonic acids such as methanesulfonic acid and ethanesulfonic acid, aromatic sulfonic acids such as benzenesulfonic acid, and phenols such as phenol.

The resin composition for a ceramic green sheet of the present invention may contain a plasticizer. Adding a plasticizer can significantly improve the mechanical strength and flexibility of the resulting ceramic green sheet.

Examples of the plasticizer include phthalate diesters such as dioctyl phthalate (DOP) and dibutyl phthalate (DBP), adipate diesters such as dioctyl adipate, and alkylene glycol diesters such as triethylene glycol-di-2-ethylhexanoate and tetraethylene glycol-di-2-ethylhexanoate. Examples also include alkylene glycol diesters such as triethylene glycol-di-2-ethylbutyrate, tetraethylene glycol-di-2-ethylbutyrate, tetraethylene glycol-di-heptanoate, and triethylene glycol-di-heptanoate.

In the resin composition for a ceramic green sheet of the present invention, the lower limit of the amount of the plasticizer relative to 100 parts by weight of the polyvinyl acetal resin is preferably 7 parts by weight, more preferably 8.5 parts by weight, and the upper limit thereof is preferably 25 parts by weight, more preferably 15 parts by weight, still more preferably 11.5 parts by weight.

The resin composition for a ceramic green sheet of the present invention may contain an organic solvent.

The organic solvent may be any organic solvent that can dissolve the polyvinyl acetal resin. Examples thereof include ketones such as acetone, methyl ethyl ketone, dipropyl ketone, and diisobutyl ketone. Examples also include alcohols such as methanol, ethanol, isopropanol, and butanol, and aromatic hydrocarbons such as toluene and xylene. Examples also include esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate. Examples also include methyl cellosolve, ethyl cellosolve, butyl cellosolve, terpineol, dihydroterpineol, butyl cellosolve acetate, butyl carbitol acetate, terpineol acetate, and dihydroterpineol acetate. Particularly preferred are alcohols, ketones, aromatic hydrocarbons, and solvent mixtures thereof from the viewpoint of coatability and drying characteristics. Preferred among these are solvent mixtures of ethanol and toluene and solvent mixtures of methyl ethyl ketone and toluene.

The resin composition for a ceramic green sheet of the present invention may contain a different resin such as a polyvinyl acetal resin other than the above polyvinyl acetal resin, an acrylic resin, or ethylcellulose, as long as the effects of the present invention are not impaired. In such a case, the amount of the above polyvinyl acetal resin relative to the entire binder resin is preferably 50% by weight or more.

To the resin composition for a ceramic green sheet of the present invention may be added an inorganic powder, a dispersant, an antioxidant, an ultraviolet absorber, a surfactant, a filler, and/or the like, as needed. In some cases, a small amount of a different resin such as an acrylic resin or a urethane resin may be added.

Examples of the inorganic powder include powders of an oxide or non-oxide of a metal or non-metal and ceramic powders. These powders each may be a powder of one compound having a single composition or a mixture of compounds each having a single composition. For the constituent elements of the oxide or non-oxide of a metal, both the cation and anion may be composed of a single element or multiple elements. The oxide or non-oxide may further contain an additive to improve the characteristics of the oxide or non-oxide. Specific examples thereof include oxides, carbides, nitrides, borides, and sulfides of Li, K, Mg, B, Al, Si, Cu, Ca, Sr, Ba, Zn, Cd, Ga, In, Y, lanthanoid, actinoid, Ti, Zr, Hf, Bi, V, Nb, Ta, W, Mn, Fe, Co, and Ni.

Specific examples of powder of an oxide containing multiple metal elements, which is typically called a multiple oxide, can be classified as follows by their crystalline structure. Examples of those having a perovskite-type structure include $NaNbO_3$, $SrZrO_3$, $PbZrO_3$, $SrTiO_3$, $BaZrO_3$, $PbTiO_3$, and $BaTiO_3$. Examples of those having a spinel-type structure include $MgAl_2O_4$, $ZnAl_2O_4$, $CoAl_2O_4$, $NiAl_2O_4$, and $MgFe_2O_4$. Examples of those having an ilmenite-type structure include $MgTiO_3$, $MnTiO_3$, and $FeTiO_3$. Examples of those having a garnet-type structure include $GdGa_5O_{12}$ and $Y_6Fe_6O_{12}$. In particular, the modified polyvinyl acetal resin of the present application exhibits high characteristics for a ceramic green sheet containing $BaTiO_3$ powder.

The inorganic powder may have any average particle size. For example, for production of a thin ceramic green sheet (thickness of 5 μm or less), the average particle size is preferably 0.05 to 0.5 μm.

When the resin composition for a ceramic green sheet of the present invention contains the inorganic powder, the lower limit of the amount of the polyvinyl acetal resin relative to 100 parts by weight of the inorganic powder is preferably 0.1 parts by weight, and the upper limit thereof is preferably 20 parts by weight. The polyvinyl acetal resin in an amount of 0.1 parts by weight or more can provide sufficient dispersibility of the inorganic powder. The polyvinyl acetal resin in an amount of 20 parts by weight or less can provide a viscosity within an appropriate range, which can improve handleability. The lower limit of the amount of the polyvinyl acetal resin is more preferably 0.6 parts by weight and the upper limit is still more preferably 15 parts by weight. In particular, the polyvinyl acetal resin in an amount of 0.6 parts by weight or more allows the inorganic powder to be more finely dispersed because the polyvinyl acetal resin can be sufficiently adsorbed onto the surface of the inorganic powder.

When the resin composition for a ceramic green sheet of the present invention contains the inorganic powder, the lower limit of the amount of the organic solvent relative to 100 parts by weight of the inorganic powder is preferably 20 parts by weight and the upper limit thereof is preferably 60 parts by weight. The organic solvent in an amount of 20 parts by weight or more can provide a viscosity within an appropriate range, thus providing sufficient dispersibility of the inorganic powder without limiting the movement of the inorganic powder. The organic solvent in an amount of 60 parts by weight or less can provide sufficient dispersibility of the inorganic powder by reducing collisions of inorganic powder particles without causing an excessively low inorganic powder concentration.

The method for producing the resin composition for a ceramic green sheet of the present invention is not limited. For example, the resin composition may be produced by a method including mixing the polyvinyl acetal resin, the organic solvent, and optional various additive inorganic powders in any of various mixers such as a ball mill, a blender mill, or a triple roll mill. The inorganic powder may be added after an inorganic dispersion is prepared separately.

A resin sheet can be obtained by applying the resin composition for a ceramic green sheet of the present invention and then heating and drying the resin composition.

The method for applying the resin composition for a ceramic green sheet of the present invention is not limited. Examples thereof include a roll coater, a die coater, and a curtain coater. For other specific methods, conventionally known methods may be used.

A resin sheet containing ceramic powder can be used as a ceramic green sheet. Such a ceramic green sheet is also encompassed by the present invention.

The ceramic green sheet may be used to produce a ceramic electronic component. For example, a ceramic electronic component may be produced by performing the steps of: applying a paste for an electrode layer to a surface of the ceramic green sheet; stacking and thermally pressure-bonding ceramic green sheets each provided with an electrode layer; and debinding and firing the obtained laminate.

The ceramic electronic component is not limited. Examples thereof include multilayer ceramic capacitors, multilayer ceramic inductors, capacitors, piezoelectric actuators, multilayer varistors, multilayer thermistors, EMI filters, aluminum nitride multilayer substrates, and alumina multilayer substrates. Such a ceramic electronic component is also encompassed by the present invention.

In the method for producing the ceramic electronic component, the step of applying a paste for an electrode layer paste to a surface of the ceramic green sheet is performed.

The paste for an electrode layer may be produced by, for example, dissolving a resin such as a polyvinyl acetal resin, ethylcellulose, or an acrylic resin as a binder resin in an organic solvent and dispersing conductive powder or the like in the solution. These resins may be used alone or in combination of two or more thereof. A paste for an electrode layer containing a polyvinyl acetal resin is preferred because such a paste has excellent adhesion to ceramic green sheets in the thermally pressure-bonding step.

In the method for producing the ceramic electronic component, after the above ceramic green sheet provided with an electrode layer is produced, at least one ceramic green sheet provided with an electrode layer is produced in the same manner and the ceramic green sheets are stacked and thermally pressure-bonded. The resulting laminate is debinded and fired, whereby a multilayer ceramic electronic component without problems such as sheet attack or cracks can be obtained.

The thermal pressure bonding step and the laminate debinding and firing step are not limited, and can be performed by conventionally known methods.

Advantageous Effects of Invention

The present invention can provide a resin composition for a ceramic green sheet capable of providing a ceramic green sheet that has high mechanical strength even with small thickness and is less likely to have appearance defects after cutting or dimensional changes after drying, and a ceramic green sheet and a multilayer ceramic capacitor each produced using the resin composition for a ceramic green sheet.

DESCRIPTION OF EMBODIMENTS

The present invention is more specifically described in the following with reference to, but not limited to, examples.

EXAMPLE 1

(Production of Polyvinyl Acetal Resin)

An amount of 2,700 g of pure water was added to 250 g of a polyvinyl alcohol resin having an average degree of polymerization of 1,000, a degree of saponification of 98.5 mol %, and a hydroxy group half-width of 350 cm$^{-1}$, and they were stirred at 90° C. for about two hours for dissolution. This solution was cooled to 40° C., and to the solution were added 100 g of hydrochloric acid having a concentration of 35% by weight and 115 g of n-butyraldehyde to perform acetalization, whereby a reaction product was precipitated. Thereafter, the acetalization was completed at 40° C., followed by neutralization, washing with water, and drying by common methods. Thus, white powder of a polyvinyl acetal resin was obtained.

The obtained polyvinyl acetal resin was dissolved in DMSO-d$_6$ at a concentration of 10% by weight. The acetal group content, the hydroxy group content, and the acetyl group content were measured by $^{13}$C-NMR. Here, the hydroxy group half-width of the polyvinyl alcohol resin was measured using HORIBA FT-720 (produced by Horiba, Ltd.).

(Production of Resin Composition for Ceramic Green Sheet)

An amount of 10.0 parts by weight of the obtained polyvinyl acetal resin and 1.0 part by weight of DOP as a plasticizer were added to 45.0 parts by weight of an ethanol/toluene solvent mixture (weight ratio 1:1). They were stirred for dissolution, whereby a resin composition for a ceramic green sheet was obtained.

(Production of Resin Sheet)

The obtained resin composition for a ceramic green sheet was applied using a coater onto a release-treated PET film to a dried thickness of 15 μm, and then heated and dried at 70° C. for 120 minutes, whereby a resin sheet was obtained.

EXAMPLE 2

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 1,700, a degree of saponification of 98.5 mol %, and a hydroxy group half-width of 350 cm$^{-1}$ was used.

EXAMPLE 3

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 3,300, a degree of saponification of 98.5 mol %, and a hydroxy group half-width of 350 cm$^{-1}$ was used.

EXAMPLE 4

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 4,900, a degree of saponification of 98.5 mol %, and a hydroxy group half-width of 350 cm$^{-1}$ was used.

EXAMPLE 5

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 1,700, a degree of saponification of 98.5 mol %, and a hydroxy group half-width of 350 cm$^{-1}$ was used.

EXAMPLE 6

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 1,700, a degree of saponification of 98.5 mol %, and a hydroxy group half-width of 350 cm$^{-1}$ was used.

EXAMPLE 7

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 1,700, a degree of saponification of 98.5 mol %, and a hydroxy group half-width of 350 cm$^{-1}$ was used.

EXAMPLE 8

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 5,000, a degree of saponification of 98.5 mol %, and a hydroxy group half-width of 350 cm$^{-1}$ was used.

EXAMPLE 9

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 9,200, a degree of saponification of 98.5 mol %, and a hydroxy group half-width of 350 cm$^{-1}$ was used.

EXAMPLE 10

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 8,000, a degree of saponification of 98.5 mol %, and a hydroxy group half-width of 350 cm$^{-1}$ was used.

EXAMPLE 11

(Production of Polyvinyl Acetal Resin)

A polyvinyl acetal resin, a resin composition for a ceramic green sheet, and a resin sheet were produced as in Example 1 except that 250 g of a polyvinyl alcohol resin having a degree of polymerization of 1,700, a degree of saponification of 98.5 mol %, and a hydroxy group half-width of 350 cm$^{-1}$ was used.

COMPARATIVE EXAMPLE 1

A polyvinyl acetal resin, a resin composition for a ceramic green sheet, and a resin sheet were produced as in Example 1 except that 250 g of a polyvinyl alcohol resin having a degree of polymerization of 600, a degree of saponification of 98.5 mol %, and a hydroxy group half-width of 335 cm$^{-1}$ was used.

COMPARATIVE EXAMPLE 2

A polyvinyl acetal resin, a resin composition for a ceramic green sheet, and a resin sheet were produced as in Example 1 except that 250 g of a polyvinyl alcohol resin having a degree of polymerization of 4,900, a degree of saponification of 98.5 mol %, and a hydroxy group half-width of 335 cm$^{-1}$ was used.

COMPARATIVE EXAMPLE 3

A polyvinyl acetal resin, a resin composition for a ceramic green sheet, and a resin sheet were produced as in Example 1 except that 250 g of a polyvinyl alcohol resin having a degree of polymerization of 1,700, a degree of saponification of 98.5 mol %, and a hydroxy group half-width of 335 cm$^{-1}$ was used.

COMPARATIVE EXAMPLE 4

A polyvinyl acetal resin, a resin composition for a ceramic green sheet, and a resin sheet were produced as in Example 1 except that 250 g of a polyvinyl alcohol resin having a degree of polymerization of 3,300, a degree of saponification of 98.5 mol %, and a hydroxy group half-width of 335 cm$^{-1}$ was used.

COMPARATIVE EXAMPLE 5

A polyvinyl acetal resin, a resin composition for a ceramic green sheet, and a resin sheet were produced as in Example 1 except that 250 g of a polyvinyl alcohol resin having a degree of polymerization of 4,900, a degree of saponification of 98.5 mol %, and a hydroxy group half-width of 335 cm$^{-1}$ was used.

COMPARATIVE EXAMPLE 6

A polyvinyl acetal resin, a resin composition for a ceramic green sheet, and a resin sheet were produced as in Example 1 except that 250 g of a polyvinyl alcohol resin having a degree of polymerization of 9,000, a degree of saponification of 98.5 mol %, and a hydroxy group half-width of 335 cm$^{-1}$ was used.

COMPARATIVE EXAMPLE 7

A polyvinyl acetal resin, a resin composition for a ceramic green sheet, and a resin sheet were produced as in Example 1 except that 250 g of a polyvinyl alcohol resin having a degree of polymerization of 9,000, a degree of saponification of 98.5 mol %, and a hydroxy group half-width of 335 cm$^{-1}$ was used.

(Evaluation)

The polyvinyl acetal resins, resin compositions for a ceramic green sheet, and resin sheets obtained in the examples and the comparative examples were evaluated as follows. Table 1 shows the results.

(1) Determination of Half-Width in Terms of Mol %

The hydroxy group half-width of each of the polyvinyl acetal resins obtained in the examples and the comparative examples was measured by IR measurement using HORIBA FT-720 (produced by Horiba, Ltd.). From the hydroxy group half-width measured by IR measurement and the hydroxy group content measured by $^{13}$C-NMR, the hydroxy group half-width in terms of mol % was determined for the polyvinyl acetal resin.

(2) Tan δ and Loss Modulus E"

The obtained resin sheet was cut into a size of 0.5 cm×2.0 cm to prepare a specimen, and then the specimen was subjected to dynamic viscoelasticity measurement using a DMA (produced by IT Measurement Co., Ltd.) under the following conditions.

The tan δ (loss tangent) value used was the value at the peak-top temperature. Similarly, the storage modulus E' and loss modulus E" values were measured at the peak-top temperature. The difference between the peak-top temperature of the tan δ and the peak-top temperature of the loss modulus E" (difference in peak-top temperature: [peak-top temperature of tan δ]−[peak-top temperature of loss modulus E"]) was calculated.

(Measurement Conditions)

Measurement mode: tensile mode
Forced oscillation frequency: 1 Hz
Temperature range: 30° C. to 150° C.
Temperature increase rate: 6° C./min (3) Tensile Modulus of Elasticity, Elongation at Break, and Stress at Break (Production of Ceramic Green Sheet)

One part by weight of a polyvinyl acetal resin (produced by Sekisui Chemical Co., Ltd., BL-1) was added to a solvent mixture of 20 parts by weight of toluene and 20 parts by weight of ethanol, and they were stirred for dissolution. Subsequently, to the obtained solution was added 100 parts by weight of barium titanate powder (produced by Sakai Chemical Industry Co., Ltd., BT01, average particle size 0.1 µm), followed by stirring in a bead mill (produced by AIMEX Co., Ltd., Ready Mill) for 180 minutes, whereby an inorganic dispersion was prepared.

To the obtained inorganic dispersion was added the resin composition for a ceramic green sheet. After stirring in a bead mill for 90 minutes, the mixture was applied using a coater onto a release-treated PET film to a dried thickness of 20 µm, and then heated and dried at 40° C. for 30 minutes. The PET film was removed, whereby a ceramic green sheet was obtained.

The tensile modulus of elasticity (MPa), elongation at break (%), and stress at break (MPa) of the obtained ceramic green sheet were measured in conformity with JIS K 7113 using a tensile tester (produced by Shimadzu Corporation, AUTOGRAPH AGS-J) at a tensile speed of 20 mm/min.

(4) Section State

The fracture surface after the measurement of "(3) Tensile modulus of elasticity, elongation at break, and stress at break" was observed with an SEM, and evaluated in accordance with the following criteria.

○○ (Excellent): The fracture surface was not chipped, cracked, or scratched.
○ (Good): The fracture surface was not chipped or cracked, but was scratched.
Δ (Fair): The fracture surface was not chipped but was cracked.
× (Poor): The fracture surface was chipped.

(5) Dimensional Change Rate

A ceramic green sheet was produced as in "(3) Tensile modulus of elasticity, elongation at break, and stress at break". The obtained ceramic green sheet was dried at 70° C. for three hours. The dimensional change rate before and after the drying at 70° C. was calculated and evaluated in accordance with the following criteria.

○○ (Excellent): not higher than 2%
○ (Good): higher than 2% and not higher than 3%
Δ (Fair): higher than 3% and not higher than 4%
× (Poor): higher than 4%

TABLE 1

| | Polyvinyl acetal resin | | | | Polyvinyl acetal resin film evaluation | | | | | GS evaluation | | | | |
|---|---|---|---|---|---|---|---|---|---|---|---|---|---|---|
| | Degree of polymerization | Acetal group content (mol %) | Acetyl group content (mol %) | Hydroxy group content (mol %) | Hydroxy group half-width in terms of mol % (mol %/cm$^{-1}$) | Tan δ | E" [Pa] | Tan δ – E" difference in peak temperature | Stress at break [MPa] | Modulus of elasticity [MPa] | Elongation at break [%] | Stress at break [MPa] | Modulus of elasticity [MPa] | Elongation at break [%] | Section state SEM observation | Dimensional change rate |
| Example 1 | 1000 | 65.0 | 1.5 | 33.5 | 0.142 | 1.55 | 2.30 × 10$^8$ | 14.8 | 60 | 950 | 280 | 27 | 910 | 15 | ○ | ○○ |
| Example 2 | 1700 | 65.0 | 1.5 | 33.5 | 0.137 | 1.97 | 2.33 × 10$^8$ | 13.1 | 75 | 900 | 410 | 32 | 1050 | 23 | ○○ | ○○ |
| Example 3 | 3300 | 65.0 | 1.5 | 33.5 | 0.140 | 2.33 | 2.36 × 10$^8$ | 13.0 | 85 | 900 | 370 | 34 | 1080 | 23 | ○ | ○ |
| Example 4 | 4900 | 65.0 | 1.5 | 33.5 | 0.138 | 2.39 | 2.38 × 10$^8$ | 12.6 | 85 | 955 | 280 | 38 | 1100 | 25 | ○○ | ○○ |
| Example 5 | 1700 | 65.0 | 1.0 | 34.0 | 0.100 | 2.01 | 2.35 × 10$^8$ | 12.8 | 77 | 940 | 400 | 33 | 1080 | 24 | ○○ | ○○ |
| Example 6 | 1700 | 65.0 | 2.2 | 32.8 | 0.148 | 1.88 | 2.30 × 10$^8$ | 13.5 | 74 | 890 | 420 | 31 | 1050 | 22 | ○○ | ○○ |
| Example 7 | 1700 | 78.0 | 1.5 | 21.5 | 0.140 | 1.80 | 2.30 × 10$^8$ | 14.0 | 70 | 880 | 435 | 33 | 1000 | 25 | ○ | ○ |
| Example 8 | 5000 | 65.0 | 1.5 | 33.5 | 0.145 | 2.40 | 2.32 × 10$^8$ | 12.2 | 88 | 910 | 410 | 38 | 1190 | 28 | ○ | ○ |
| Example 9 | 9200 | 65.0 | 1.5 | 33.5 | 0.140 | 2.36 | 2.31 × 10$^8$ | 10.0 | 92 | 890 | 440 | 41 | 1190 | 30 | ○ | △ |
| Example 10 | 8000 | 65.0 | 1.5 | 33.5 | 0.144 | 2.39 | 2.38 × 10$^8$ | 11.0 | 90 | 900 | 425 | 40 | 1200 | 30 | ○ | ○ |
| Example 11 | 1700 | 50.5 | 1.5 | 48.0 | 0.148 | 1.30 | 2.36 × 10$^8$ | 14.7 | 77 | 1010 | 190 | 30 | 1000 | 17 | △ | ○○ |
| Comparative Example 1 | 600 | 65.0 | 1.5 | 33.5 | 0.152 | 1.00 | 2.29 × 10$^8$ | 16.2 | 35 | 410 | 250 | 19 | 880 | 13 | × | ○ |
| Comparative Example 2 | 4900 | 65.0 | 1.5 | 33.5 | 0.137 | 2.40 | 2.28 × 10$^8$ | 14.5 | 56 | 800 | 245 | 29 | 995 | 26 | △ | △ |
| Comparative Example 3 | 1700 | 65.0 | 1.5 | 33.5 | 0.153 | 2.28 | 2.19 × 10$^8$ | 15.2 | 70 | 720 | 300 | 25 | 900 | 15 | △ | △ |
| Comparative Example 4 | 3300 | 65.0 | 1.5 | 33.5 | 0.165 | 1.23 | 2.22 × 10$^8$ | 15.0 | 75 | 750 | 330 | 26 | 1000 | 23 | △ | △ |
| Comparative Example 5 | 4900 | 65.0 | 1.5 | 33.5 | 0.159 | 1.22 | 2.21 × 10$^8$ | 14.9 | 78 | 780 | 350 | 28 | 900 | 25 | △ | × |
| Comparative Example 6 | 9000 | 76.5 | 1.5 | 22.0 | 0.165 | 1.20 | 2.28 × 10$^8$ | 14.3 | 80 | 820 | 375 | 30 | 900 | 23 | △ | × |
| Comparative Example 7 | 9000 | 58.0 | 1.5 | 40.5 | 0.170 | 1.21 | 2.22 × 10$^8$ | 14.1 | 77 | 800 | 310 | 31 | 1000 | 20 | △ | × |

INDUSTRIAL APPLICABILITY

The present invention can provide a resin composition for a ceramic green sheet capable of providing a ceramic green sheet that has high mechanical strength even with small thickness and is less likely to have appearance defects after cutting or dimensional changes after drying, and a ceramic green sheet and a multilayer ceramic capacitor each produced using the resin composition for a ceramic green sheet.

The invention claimed is:

1. A resin composition for a ceramic green sheet, the resin composition comprising a polyvinyl acetal resin, wherein
the resin composition has a tan δ peak top of 1.25 or more and a loss modulus E" of $2.30 \times 10^8$ Pa or more, and
the polyvinyl acetal resin has a hydroxy group half-width in terms of mol % of 0.01 to 0.15 mol %/cm$^{-1}$ as determined by NMR measurement and IR measurement.

2. The resin composition for a ceramic green sheet according to claim 1, further comprising a plasticizer in an amount of 25 parts by weight or less relative to 100 parts by weight of the polyvinyl acetal resin.

3. The resin composition for a ceramic green sheet according to claim 1,
wherein the polyvinyl acetal resin is an acetalized product of a polyvinyl alcohol resin having a degree of saponification of 75 mol % or more.

4. The resin composition for a ceramic green sheet according to claim 1,
wherein the polyvinyl acetal resin has an acetal group content of 45 to 83 mol %.

5. The resin composition for a ceramic green sheet according to claim 1,
wherein the polyvinyl acetal resin has an average degree of polymerization of 1,000 to 10,000.

6. A ceramic green sheet produced using the resin composition for a ceramic green sheet according to claim 1.

7. A multilayer ceramic capacitor comprising the ceramic green sheet according to claim 6.

* * * * *